United States Patent [19]

Staba

[11] 3,989,683

[45] Nov. 2, 1976

[54] METHOD OF TREATING KARAYA GUM

[75] Inventor: Edward A. Staba, Higganum, Conn.

[73] Assignee: Olin Corporation, New Haven, Conn.

[22] Filed: July 19, 1973

[21] Appl. No.: 380,626

[52] U.S. Cl. .................................. 536/114; 149/28
[51] Int. Cl.² ......................................... C07H 15/04
[58] Field of Search .......... 260/209 R, 234 R, 611.5

[56] References Cited
UNITED STATES PATENTS

| | | | |
|---|---|---|---|
| 3,300,473 | 1/1967 | Christoffel et al. | 260/209 R |
| 3,379,720 | 4/1968 | Reid | 260/209 R |
| 3,507,852 | 4/1970 | Kuchmy | 260/209 R |
| 3,714,144 | 1/1973 | Feuge et al. | 260/234 R |
| 3,716,526 | 2/1973 | Schweiger | 260/209 R |
| 3,723,409 | 3/1973 | Yueh | 260/209 R |
| 3,849,341 | 11/1974 | Lamberti | 260/234 R |

*Primary Examiner*—Johnnie R. Brown
*Attorney, Agent, or Firm*—Donald R. Motsko; William W. Jones

[57] ABSTRACT

A method of treating karaya gum to stabilize it so that it is less sensitive to the presence of certain priming compositions and will exhibit, when used with priming compositions, improved extrusion characteristics and rheological stability. The karaya gum is suspended in an anhydrous alcohol and treated with a reagent which is soluble in the alcohol whereby the gum renders a priming composition suitable for extrusion for mechanically charging primers.

4 Claims, No Drawings

METHOD OF TREATING KARAYA GUM

BACKGROUND OF THE INVENTION

This invention relates to a method for chemically treating karaya gum. More particularly this invention relates to a method of treating karaya gum to improve its properties so that when used as a constituent of a plastic priming mixture, it will improve the extrudable character and rheological stability of such mixtures to enable their use in the mechanical charging of primers.

The use of karaya gum as an adhesive or binder in priming compositions is disclosed in U.S. Pat. No. 3,423,259. That patent also discloses that besides the adhesive or binder action, karaya gum provides a means of controlling the fluidity of wet priming compositions and a means of retaining water in the mixture so that separation of water from the crystalline and granular solids of the priming composition in the mixture does not occur.

U.S. Pat. No. 3,423,259 also mentions that priming mixtures prepared with karaya gum can be wetted sufficiently without encountering separation of the solid and liquid phases to provide the fluidity required for the extrusion of the bulk material. The patent further states that such mixtures are sufficiently plastic and will flow readily enough to permit feeding of the bulk material into a pellet forming mechanism capable of charging primers mechanically. A method and mechanism for mechanically charging primers by an extrusion process is more fully set forth in copending application, Ser. No. 253,481, filed May 15, 1972 now U.S. Pat. No. 3,820,578.

In the subsequent development of the mechanical charging process it became evident that with some types of priming compositions, particularly with respect to center fire priming compositions, a properly extrudable composition having sufficiently long pot life cannot be obtained by simply including karaya gum in the formulation. The difficulty appeared to be the result of the incompatability of the karaya gum with one or more of the materials in the primer formulation. Such incompatability was manifested by a decrease of viscosity and/or lubricity of the gum dispersion on exposure to the compounds present in these priming compositions. Viscosity of the gum dispersion is essential for retention of water in the mixture to prevent the settling of solids and the separation of water. Lubricity permits the granular and crystalline particles of priming composition to slide by each other readily avoiding the occurence of a tendency for packing or "bridging". Both of these factors are important in imparting extrudable character to the priming mixtures. Ideally, an extrudable priming mixture should contain karaya gum in the amount of 1-2% of the total solids by weight and about 16-17% water. However, with certain priming compositions, the presence of certain ingredients caused a significant lowering of the viscosity of the mixture rendering it unsuitable for extruding.

If additional karaya gum is added to compensate for the loss of viscosity the added karaya gum would have a deleterious effect upon the dried priming composition resulting in a significant loss in the sensitivity. With the present invention, the karaya gum is treated to improve its compatability with various compounds of primer compositions so that substantially less than 3% of karaya gum can be used to avoid this deleterious effect.

SUMMARY OF THE INVENTION

In view of the above, it is an object of the present invention to provide a process for chemically treating karaya gum so that the treated karaya gum, when incorporated into a plastic priming mixture, will have improved extrusion characteristics and rheological stability as compared to the same priming mixture utilizing untreated karaya gum.

More specifically, it is an object of this invention to provide a method of chemically treating karaya gum so that it is less sensitive to the presence of priming composition ingredients when used in a primer composition, thereby "stabilizing" the karaya gum.

In accordance with the present invention, generally stated, the karaya gum is suspended in anhydrous alcohol in which it does not disperse or dissolve. The karaya gum is then treated with a suitable reagent which is soluble in the alcohol.

The temperature at which the treatment occurs depends upon the particular reagent and the time of treatment necessary to achieve a desirable degree of "stabilization" which is established experimentally at a given temperature level. It is essential to avoid degradation of the karaya gum or any change that would impare its desirable characteristics.

After the period of treatment, the powdered gum is separated from the alcohol in which it was suspended and treated to remove any residual alcohol or reagents.

DETAILED DESCRIPTION OF PREFERRED EMBODIMENTS

Karaya gum is a naturally occuring polysaccharide of fairly high molecular weight and its composition and structure are not fully understood at this time. However, it could be logically assumed such a polymer would contain many of the functional group characteristics of the constituent sugar molecules such as: hydroxyl, aldehyde, and ketone groups. In addition, carboxylic acid groups are present as part of the D-galacturonic acid and acetyl groups in the polymer. It is theorized, therefore, if the gum is treated with a suitable reagent and combined with it by means of a condensation reaction with the functional groups, a stabilizing effect might be realized.

Due to the fact that the composition of karaya gum is not understood, it is impossible to accurately predict what reagents will have the desired effect upon the karaya gum except by experimentation. Some reagents were found to have a significant stabilizing effect upon the karaya gum. Other reagents were found to have no effect on the karaya gum, while others had quite drastic effects causing severe degradation of the gum, rendering it unsuitable for its intended purpose.

Karaya gum is prepared by the physical purification, grinding and blending of exudate of trees belonging to the genus Sterculia, usually of the species Sterculia urens, as described in "The Encyclopedia of Chemical Technology" (2nd Ed.), Kirk-Othmer, vol. 10, pp. 746-48 (1966). The purer grade of the gum meeting specifications cited in the National Formulary for food and pharmaceutical uses are preferred for use in accordance with this invention.

The karaya gum is placed in a vessel containing an anhydrous alcohol. Preferably alcohols having relatively low boiling points are used to enhance the recovery procedure at the end of the treating process. Alcohols of relatively high boiling points, such as the polyhydric alcohols should in most cases be avoided as their boiling points are so high that during the removal of the alcohol, the gum may be adversely affected. The preferred alcohols are: methanol; propanol-2; normal propanol; ethanol; and the butyl alcohols. The alcohols must also be of the type in which the karaya gum will not disperse or dissolve. The amount of alcohol used for suspending the karaya gum can vary within wide limits. There must be enough alcohol present to provide a suitable suspension of the karaya gum and also a sufficient quantity to dissolve the amount of reagent required for the treatment.

A suitable reagent, soluble in the alcohol, is added to the karaya gum suspension. The reagents are of the type that will react with the functional groups of the karaya gum via a condensation reaction. Due to the fact that the exact composition of karaya gum is not known, the nature of the chemical change in the karaya gum when treated with the reagents cannot be ascertained. In addition, it is impossible to predict what reagents will produce the required change in the karaya gum, so that the gum, when used in extrudable plastic priming compositions will have an improved effect upon extrudability and pot life of the composition over a similar composition utilizing untreated karaya gum. The effectiveness of a given reagent must be ascertained experimentally on a trial and error basis. The preferred group of reagents which demonstrated an ability to successfully treat karaya gum include: tannic acid; benzoic acid; sorbic acid; gluconic acid; and gluconic acid D-lactone.

The time and temperature at which the treatment is carried out depends upon the particular reagent as some are faster acting than others. Generally, it has been found that some will react at room temperature while others will react better if they are treated at the reflux temperature of the alcohol. It has been found that the use of an agitator to keep the powdered gum suspended during the period of treatment is generally desirable.

After the period of treatment, the powdered gum is filtered to separate it from the alcohol in which it was suspended. The gum is then washed in the filter repeatedly with small portions of fresh alcohol to remove the mother liquor containing the residual reagent used to treat the gum. The treated and washed powdered gum is removed from the filter and spread out in a tray so residual alcohol may be removed by evaporation, either at room temperature, or by raising the temperature to the boiling point of the alcohol.

Numerous experiments were conducted to ascertain suitable reagents. These are set forth below in Table I. As will be noticed, some reagents significantly improved the characteristics of the karaya gum over that of the untreated gum. Others exhibited no improved characteristics, while others had a degrading effect upon the gum.

TABLE I

| Treating Reagent | Gum Procedure | Gum Condition | Gum ppH | Water % | Mix Extrusion Performance | Pot Life |
|---|---|---|---|---|---|---|
| Formaldehyde 37% | O-M-2 | Powder | 3 | 8.6 | Good | 24 hrs. |
| Formaldehyde 37% | O-M-2 | Powder | 3 | 20.1 | Good | — |
| Formaldehyde 37% | O-M-2 | Powder | 2 | 16.7 | Good | 24 hrs. |
|  |  |  | 3 | 16.8 | Good | 24 hrs. |
| Dimethyl Sulfate | K-M-2 | Degraded | — | — | — | — |
| Dimethyl Sulfate | J-M-1 | Powder | 3 | 16.1 | Poor | — |
| Acetic Anhydride | E-M-2 | Powder | 3 | 21.3 | Good | 14 days |
| Acetic Anhydride | D-P-2 | Powder | 3 | 17.0 | Good | 48 hrs. |
| Acetic Anhydride | E-M-2 | Powder | 3 | 21.3 | Good | 28 days |
|  |  | 3 | 19.7 | Good | 19 days |  |
|  |  |  | 1.5 | 18.4 | Fair-Poor | 24 hrs. |
| Hydrazine Hydrate | D-M-2 | Powder | 3 | — | None | — |
| Guanidine Carbonate | G-M-2 | Powder | 3 | — | None | — |
| Oxalic Acid | C-M-2 | Degraded | — | — | — | — |
| Ethylene Glycol | D-M-2 | Powder | 1.5 | 15.2 | None | — |
| Urea | B-M-2 | Powder | 1.5 | 15.7 | None | — |
| Glycerol | E-M-2 | Powder | 1.5 | 16.3 | None | — |
| Hippuric Acid | C-M-2 | Degraded | — | — | — | — |
| Hippuric Acid | C-M-1 | Gel | — | — | — | — |
| d-Glucose | C-M-2 | No Change | — | — | — | — |
| Glycolic Acid | B-M-1 | Heavy Gel | — | — | — | — |
| Pentaerythritol | B-M-2 | No Change | — | — | — | — |
| Phloroglucinol | B-M-2 | Powder | 1.5 | 15.3 | None | — |
| Anthranilic Acid | A-M-2 | Powder | 1.5 | 16.3 | None | — |
| d-Glucose Pentaacetate | H-M-2 | Powder | 1.5 | 15.9 | None | — |
| Furfural | J-M-2 | Powder | 1.5 | 16.9 | Poor | — |
| Diacetyl | I-M-2 | Powder | 1.5 | 17.8 | Poor | — |
| Pentaerythritol Tetraacetate | H-M-2 | Powder | 1.5 | 17.4 | None | — |
| Pyrogallol | H-M-2 | Powder | 1.5 | 17.2 | None | — |
| Pimelic Acid | B-M-2 | Powder | 1.5 | 17.1 | None | — |
| Gallic Acid | C-M-2 | Powder | 1.5 | 16.1 | Fair-Poor | 24 hrs. |
| Glycine | B-M-2 | Powder | 1.5 | 22.0 | Good-Required high water | 72 hrs. |
| Benzoic Acid | B-M-2 | Powder | 1.5 | 15.6 | Fair | 24 hrs. |
| Tannic Acid | C-M-2 | Powder | 1.5 | 18.2 | Good | 24 hrs. |

TABLE 1-continued

| Treating Reagent | Procedure | Gum Condition | Gum ppH | Water % | Mix Extrusion Performance | Pot Life |
|---|---|---|---|---|---|---|
| Tannic Acid | C-P-2 | Powder | 1.5 | 17.0 | Poor | — |
| Tannic Acid | C-P-1 | Powder | 1.5 | 16.0 | Very Poor | — |
| Sorbic Acid | H-M-2 | Powder | 1.5 | 16.4 | Good | 48 hrs. |
| Gluconic Acid d-Lactone | B-M-2 | Powder | 1.5 | 18.1 | Very Good | 48 hrs. |
| Gluconic Acid d-Lactone | B-M-2 | Powder | 1.5 | 16.4 | None | — |
| Gluconic Acid d-Lactone | N-M-2 | Powder | 1.5 | 15.4 | Fair | — |
| Gluconic Acid | C-M-2 | Partly Solid | — | — | — | — |
| Gluconic Acid | A-M-1 | Powder | 1.5 | 16.0 | Good | 72 hrs. |
| Gluconic Acid | B-M-1 | Powder | 1.5 | 16.7 | Good | 72 hrs. |
|  |  |  | 1.5 | 15.8 | 500 gm. Good | 48 hrs. |
|  |  |  | 1.5 | 17.1 | 200 gm. Good | 96 hrs. |
|  |  |  | 1.5 | 17.9 | Good | 48 hrs. |
| Gluconic Acid | M-M-1 | Gummy | — | — | — | — |
| Gluconic Acid | H-M-1 | Gummy | — | — | — | — |
| Gluconic Acid | H-M-1 | Powder | 1.5 | 17.4 | Good | 24 hrs. |
| Gluconic Acid 50% | F-M-1 | Powder | 1.5 | 16.6 | Poor | — |
| Gluconic Acid 50% | L-M-2 | Powder | 1.5 | 17.4 | Very Good | 96 hrs. |
|  |  |  | 1.5 | 16.9 | 200 gr. Fair | 24 hrs. |
| Gluconic Acid 50% | D-M-1 | Powder | 1.5 | 17.9 | Good | 72 hrs. |
| Gluconic Acid 50% | P-M-2 | Overheated | — | — | — | — |
| Gluconic Acid 50% | R-M-2 | Powder | 1.5 | 18.6 | Very Good | 72 hrs. |
| Gluconic Acid 50% | R-M-1 | Powder | 1.5 | 18.2 | Good | 72 hrs. |
| Gluconic Acid 50% | R-M-2 | Powder | 1.5 | 18.4 | Very Good | 72 hrs. |
| Gluconic Acid 50% | P-M-1 | Powder | 1.5 | 17.0 | Good | 48 hrs. |

The treatment procedure was as follows:
Component amounts:
A — 20 gm. gum, 100 ml alcohol, 5 gm. reagent
B — 20 gm. gum, 100 ml alcohol, 10 gm. reagent
C — 20 gm. gum, 100 ml alcohol, 15 gm. reagent
D — 20 gm. gum, 100 ml alcohol, 10 ml reagent
E — 20 gm. gum, 100 ml alcohol, 15 ml reagent
F — 20 gm. gum, 100 ml alcohol, 20 ml reagent
G — 20 gm. gum, 125 ml alcohol, 5 gm. reagent
H — 20 gm. gum, 125 ml alcohol, 10 gm. reagent
I — 20 gm. gum, 125 ml alcohol, 5 ml reagent
J — 20 gm. gum, 125 ml alcohol, 10 ml reagent
K — 20 gm. gum, 125 ml alcohol, 15 ml reagent
L — 20 gm. gum, 140 ml alcohol, 20 ml reagent
M — 20 gm. gum, 250 ml alcohol, 20 gm. reagent
N — 40 gm. gum, 200 ml alcohol, 20 gm. reagent
O — 100 gm. gum, 625 ml alcohol, 50 ml reagent
P — 100 gm. gum, 750 ml alcohol, 100 ml reagent
R — 150 gm. gum, 1125 ml alcohol, 150 ml reagent Alcohol used:
M — Methanol
P — Propanol-2

Reacted two hours with agitation at:
1 — Room Temperature
2 — Reflux Temperature The priming composition forming the basis for the extrusion mix was as follows:

| Normal lead styphnate | 37% by weight |
|---|---|
| Tetrazene | 4% by weight |
| Barium nitrate | 32% by weight |
| PETN | 5% by weight |
| Aluminum, atomized | 7% by weight |
| Antimony sulfide | 5% by weight |
|  | 100% |

The gum percentage of the extrusion mix is based on parts per 100 dry weight of the priming composition. The water content is based on percentage by weight.

The extrusion performance was tested on an apparatus comprising a plastic extrusion cylinder provided with a nozzle 3 1/6 inches in diameter. The extrusion cylinder was charged with the primer mix and a piston was inserted in the cylinder behind the mix. A plunger from an air cylinder was brought in contact with the piston and the air cylinder pressurized to 40 psi resulting in a force of 39.8 pounds on the mix. A result was considered good if a column 2¾ inches long could be extruded in a period of time not exceeding 20 seconds. Times greater than this were considered fair to poor, while times less than 10 seconds were considered very good. The pot life of a particular extrusion mix was determined by periodically extruding the mixture as indicated above and determining the length of time that transpired until it would take longer than 20 seconds to extrude a column 2¾ inches long. Between extrusions, the priming mixture was stored in a sealed primer bowl at a temperature of 5° C.

In the case where "None" is indicated in the Performance column, no test was conducted as there were indications that the results would be unfavorable or no better than with the use of untreated gum.

A specific example of the treatment of karaya gum in accordance with the present invention involved the use of 185 grams (150 ml.) gluconic acid in the form of 50% aqueous solution, 150 grams karaya gum and 1125 ml. anhydrous methanol. The gluconic acid solution was placed in a 3-neck round bottom flask having a 3 liter capacity. The flask and its contents were weighed and the flask placed in a vacuum oven and the water evaporated off from the solution at 50° C in a vacuum of 25–30 inches of mercury. The weight of the flask and its contents were checked periodically until on successive weighings there was negligible weight loss. The weight loss was in the range of 90–95 grams. The object of this drying step was to remove water in which the powdered gum is dispersible.

After the gluconic acid was essentially dry, as determined by weight loss, the methanol was added to the flask and the contents agitated briefly by shaking the flask until the gluconic acid was dissolved in the methanol. The powdered karaya gum was added to the methanol solution and a mechanically driven agitator installed in the central neck of the 3-neck flask. One of the remaining necks was equipped with a reflux condenser while the third neck was stoppered.

The flask was installed in a water bath and the temperature of the bath raised to 85°–90° C to boil the methanol and maintain a suitable rate of condensation in the reflux condenser. The mixture was refluxed for 2 hours, while it was mechanically agitated, after which the flask was removed from the water bath and allowed to cool. After cooling, the batch was transferred to a buchner funnel of suitable size and the suspended powdered gum was collected on the filter. After the mother liquor had drained as thoroughly as possible, the powdered gum was washed with three successive 150 ml. portions of fresh methanol to remove any residual gluconic acid. The treated gum was removed from the filter and spread out in an enamelware tray and allowed to dry at room temperature.

The treated gum had essentially the same appearance as the untreated gum, but the properties of the treated gum were changed as a consequence of combination with the gluconic acid. The manner in which the gluconic acid combined with the gum is not known, but a significant increase in the weight of the recovered gum was realized. In a typical case, 160 grams of treated gum were obtained when 150 grams of untreated gum were used as the starting material, even though there was an appreciable handling loss in the process.

Aqueous dispersions of treated karaya gum were found to be more stable in the presence of the priming ingredients mentioned above. A batch of such priming composition prepared with treated karaya gum comprising 1.5% of the total solids by weight, and 16–17% water, remains plastic and extrudable for about 72 hours after preparation. A similar batch of priming composition, prepared with untreated karaya gum, loses plasticity and is no longer extrudable within about 8 hours after preparation.

As stated above, untreated karaya gum is satisfactory for use in most plastic priming composition for rim fire type primers. However, for some reason, the untreated karaya gum is adversely affected by one or more ingredients found in center fire priming compositions and is therefore not suitable. Such center fire priming compositions usually contain such ingredients as: lead styphnate; tetrazene; barium nitrate; antimony sulfide; powdered aluminum; and pentaerythritoltetranitrate (PETN). It appears that the antimony sulfide has the most adverse effect upon the karaya gum.

Examples of other center fire priming compositions for which treated karaya gum should provide improved results over untreated karaya gum are tabulated below:

TABLE II

|  | Examples | | |
|---|---|---|---|
|  | 1 | 2 | 3 |
| Lead styphnate | 40 | 40 | 37 |
| Tetrazene | 4 | 4 | 4 |
| Barium nitrate | 30 | 30 | 30 |
| Antimony sulfide | 16 | 15 | 25 |
| PETN[1] | 5 | 5 | — |
| Aluminum | 5 | 6 | 4 |

[1]Pentaerythritoltetranitrate

Thus, when karaya gum is treated in accordance with the present invention it can be used in making an extrudable priming mixture in cases where untreated karaya gum would not be satisfactory. The extrudable priming mixture can be used to mechanically charge primers in a machine utilizing extrusion from an enclosed bulk supply of mixture to form and size pellets in individual cavities that can be transferred to a location where the pellets can be discharged into primer cups.

What is claimed is:

1. A method of treating karaya gum to increase the stability of aqueous dispersions of the treated karaya gum in wet primer mixes to improve the extrudability and pot life of the primer mixes, said method comprising the steps of: forming a suspension of karaya gum in a solution comprising an anhydrous alcohol solvate selected from the group consisting of methanol, propanol-2, normal propanol, ethanol, and butyl alcohol, and a reagent solute selected from the group consisting of tannic acid, benzoic acid, sorbic acid, gluconic acid, gluconic acid D-lactone, formaldehyde, and acetic anhydride; maintaining said suspension at a reaction temperature equal at least to room temperature for a time period sufficient to enable said solute to form a condensation reaction product with said karaya gum; and removing said reaction product from said suspension.

2. The method of claim 1, further comprising the step of agitating said suspension during said time period.

3. The method of claim 1, wherein said reaction temperature is the boiling point of said alcohol solvate.

4. The condensation reaction product formed by the method of claim 1.

* * * * *